(12) United States Patent
Wong et al.

(10) Patent No.: US 10,528,366 B2
(45) Date of Patent: Jan. 7, 2020

(54) FACILITATING MULTI-INHERITANCE WITHIN A SINGLE INHERITANCE CONTAINER-BASED ENVIRONMENT

(71) Applicant: INTERNATIONAL BUSINESS MACHINES CORPORATION, Armonk, NY (US)

(72) Inventors: Chih-Hong Wong, Beijing (CN); Zong Lin He, Beijing (CN); Dan Qing Huang, Beijing (CN); Zi Wen Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 297 days.

(21) Appl. No.: 15/613,619

(22) Filed: Jun. 5, 2017

(65) Prior Publication Data
US 2018/0349150 A1 Dec. 6, 2018

(51) Int. Cl.
*H04N 19/52* (2014.01)
*H04N 19/70* (2014.01)
(Continued)

(52) U.S. Cl.
CPC .......... *G06F 9/4493* (2018.02); *G06F 9/4492* (2018.02); *G06F 9/45558* (2013.01);
(Continued)

(58) Field of Classification Search
CPC ..... Y10S 707/99931; Y10S 707/99933; Y04S 10/54; G06F 13/245; G06F 16/248;
(Continued)

(56) References Cited

U.S. PATENT DOCUMENTS 7,827,201 B1 11/2010 Gordon et al.
9,716,899 B2 * 7/2017 Thirumalai .......... H04N 19/597
(Continued)

OTHER PUBLICATIONS

Using Docker, O'Reilly book, 355 pages (Year: 2016).*
(Continued)

*Primary Examiner* — Thuy Dao
(74) *Attorney, Agent, or Firm* — Michael A. Petrocelli, Esq.; Kevin P. Radigan, Esq.; Heslin Rothenberg Farley & Mesiti P.C.

(57) ABSTRACT

Multi-inheritance within a single-inheritance, container-based data processing environment is provided for facilitating developing, storing, shipping and/or running software applications. More particularly, a facility is provided which includes generating, based on a configuration file with a multi-inheritance instruction, a composited image for a new container from multiple exiting images of the single-inheritance container-based environment. The multiple existing images are identified in the multi-inheritance instruction, and the generating includes creating a composited directory file which, in part, references layers of the multiple existing images and associating a command instruction of the configuration file with the composited file. The composited image is then built in associated with starting the new container based on the composited directory file and the associated command.

18 Claims, 13 Drawing Sheets

(51) Int. Cl.
*H04N 19/176* (2014.01)
*H04N 19/96* (2014.01)
*G06F 9/448* (2018.01)
*G06F 9/455* (2018.01)
G06F 11/20 (2006.01)
G06F 16/182 (2019.01)
G06F 9/445 (2018.01)

(52) U.S. Cl.
CPC ...... *G06F 9/44505* (2013.01); *G06F 11/2069* (2013.01); *G06F 16/1844* (2019.01); *G06F 2009/45562* (2013.01)

(58) Field of Classification Search
CPC .. G06F 16/283; G06F 16/285; G06F 16/9535; G06F 21/31; G06F 8/24; G06F 8/34; G06F 8/10; G06F 9/45558; G06F 9/4493; G06F 9/4492; G06F 9/44505; G06F 16/1844; H04N 19/52; H04N 19/176; H04N 19/30; H04N 19/593; H04N 19/70
See application file for complete search history.

(56) References Cited

U.S. PATENT DOCUMENTS

| | | | | |
|---|---|---|---|---|
| 9,894,383 | B2* | 2/2018 | Lin | H04N 19/597 |
| 10,038,920 | B2* | 7/2018 | Helle | H04N 19/52 |
| 10,169,209 | B2* | 1/2019 | McPherson | G06F 11/3668 |
| 2015/0254088 | A1 | 9/2015 | Chou et al. | |
| 2016/0350081 | A1 | 12/2016 | Kumar et al. | |
| 2016/0359955 | A1 | 12/2016 | Gill et al. | |
| 2016/0371175 | A1* | 12/2016 | Adar | G06F 8/36 |
| 2018/0341471 | A1* | 11/2018 | Stefanov | G06F 9/455 |

OTHER PUBLICATIONS

Docker, An Open Platform to Build, Ship, and Run Distributed Applications, Docker Inc., 350 pages (Year: 2015).*

Introduction to Docker, Reseau LoOPS, 68 pages (Year: 2015).*

Felter et al., IBM Research Report, "An Updated Performance Comparison of Virtual Machines and Linux Containers", RC25482 (AUS1407-001), Jul. 21, 2014 (12 pages).

Boettiger, Carl, "An Introduction to Docker for Reproducible Research, With Examples From the R Environment", arXiv:1410.0846v1(cs.SE), Oct. 2, 2014, (9 pages).

Seo et al., "Performance Comparison Analysis of Linux Container and Virtual Machine for Building Cloud", Advanced Science and Technology Letters, vol. 66 (Networking and Communication 2014), (pp. 105-111).

International Business Machines Corporation (IBM), "z/Architecture Principles of Operation," IBM® Publication No. SA22-7832-10, Eleventh Edition, Mar. 2015, (pp. 1-1732).

International Business Machines Corporation (IBM), "Power ISA™ Version 2.07B," International Business Machines Corporation, Apr. 9, 2015, (pp. 1-1527).

Bogosian, Matt, "dimgx Documentation, Release 0.1.5", © 2015 Matt Bogosian (aposita), May 19, 2015, <https://media.readtehdocs.org/pdf/dimgx/vo.1.5/dimgx.pdf>, (19 Pages).

Docker, Inc., "Docker and the Device Mapper Storage Driver", © 2016, retrieved Sep. 28, 2016, <http://docs.master.dockerproject.org/engine/userguide/storagedriver/device-mapper-driver/>, (21 pages).

Huang et al., "Docker LAyer Deduplication with Layer Referencing", U.S. Appl. No. 15/283,172, filed Sep. 30, 2016, (24 pages).

* cited by examiner

FACILITATING MULTI-INHERITANCE WITHIN A SINGLE INHERITANCE CONTAINER-BASED ENVIRONMENT

BACKGROUND

As one example of a single-inheritance, container-based data processing system, Docker™ is an open platform for developing, shipping, and running applications. (Docker and other Docker-based marks discussed herein are trademarks or registered trademarks of Docker, Inc., of San Francisco, Calif., USA.) At their core, such systems provide a way to run almost any application securely isolated in a container. A container may consist of an application, user-added files, and metadata for an application. Each container is built from an image, which may specify what the container holds, what process to run when the container is launched, and a variety of other configuration data. The image is a read-only template from which the container is launched. The image may consist of a series of layers. When an image needs to be changed (for example, an application needs to be updated to a new version), a new layer may get built. Rather than replacing or entirely rebuilding the whole image as may be done with a virtual machine, only that layer needs to be added or updated.

An image may start from a base image. Further, images generated for one container can be used as the basis for new images for another container. For example, if a base image has been generated, it could be used as the base image for web applications of other containers. An image can be built from these base images using a set of instructions, each of which creates a new layer in the image. However, because these layers within the image are overlays in a single inheritance tree, duplicated layers may be inevitably introduced while the image is being built. In addition, such layer duplication cannot be eliminated simply by writing the set of instructions carefully or merging multiple layers into one layer. Similar problems exist for other containerization technologies.

SUMMARY

Certain shortcomings of the prior art are overcome and advantages are provided through the provision of a computer-implemented method for facilitating multi-inheritance within a single-inheritance container-based environment. The computer-implemented method includes generating, based on a configuration file with a multi-inheritance instruction, a composited image for a new container from multiple existing images of the single inheritance container-based environment. The multiple existing images are identified in the multi-inheritance instruction. The generating includes creating a composited directory file which, in part, references layers of the multiple existing images and associating a command instruction of the configuration file with the composited file. Further, the generating includes building the composited image in association with starting the new container, where the building is based on the composited directory file and associated command.

Systems and computer program products relating to one or more aspects are also described and claimed herein. Further, services relating to one or more aspects may also be described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired by a particular application, for instance, for providing multi-inheritance within a single-inheritance, container-based processing environment.

The illustrative embodiments may be described using specific code, designs, architectures, protocols, layouts, schematics, or tools only as examples, and are not limiting to the illustrative embodiments. Furthermore, the illustrative embodiments are described in some instances using particular software, tools, and data processing environments only as an example for clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

Figure 1:
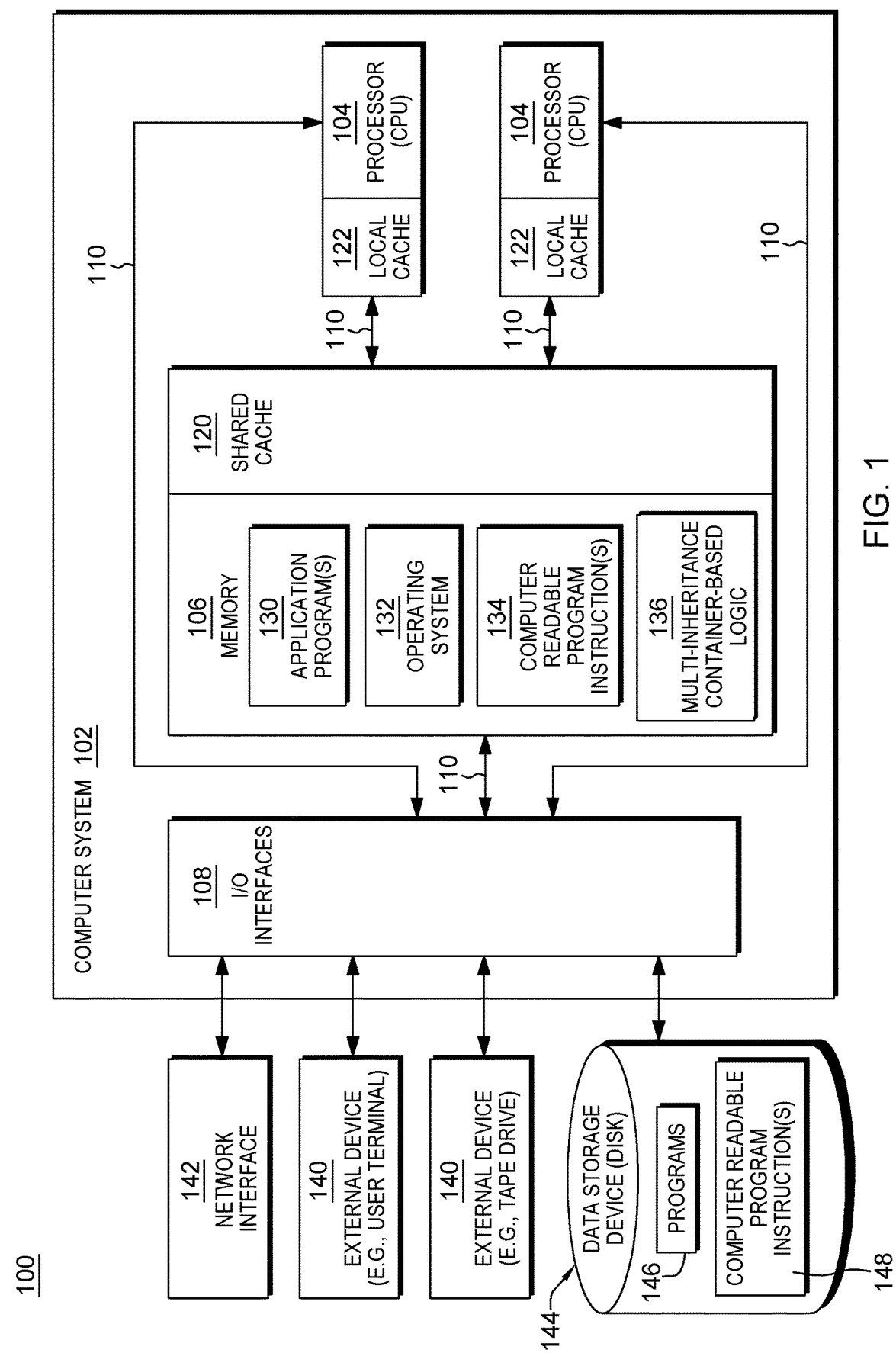
FIG. 1 depicts a block diagram of one embodiment of a data processing system which may implement processing or a processing environment, in accordance with one or more aspects of the present invention.

With reference to the figures, and in particular with reference to FIG. 1, an example diagram is shown of a data processing environment in which illustrative embodiments may be implemented. FIG. 1 is only an example and is not intended to assert or imply any limitation with regard to the environments in which different embodiments may be implemented. A particular implementation may make many modifications to the depicted environment based on the following description.

With reference to FIG. 1, as noted this figure depicts a block diagram of a data processing system in which one or more aspects of the present invention may be implemented. Data processing system 100 is an example of a computer, such as server, or other type of device, in which computer usable program code or instructions implementing one or more processes may be located for the illustrative embodiments.

In one example, data processing system 100 may be based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. z/ARCHITECTURE is a registered trademark of International Business Machines Corporation, Armonk, N.Y., USA.

In another example, the processing system may be based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The data processing system may also be based on other architectures, including, but not limited to, the Intel x86 architectures. Other examples also exist.

As shown in FIG. 1, data processing system 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Processor 104 includes a plurality of functional components used to execute instructions. These functional components include, for instance, an instruction fetch component to fetch instructions to be executed; an instruction decode unit to decode the fetched instructions and to obtain operands of the decoded instructions; instruction execution components to execute the decoded instructions; a memory access component to access memory for instruction execution, if necessary; and a write back component to provide the results of the executed instructions.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, an operating system 132, and one or more computer readable program instructions 134, as well as multi-inheritance contained-based processing logic 136 such as disclosed herein. Additionally, or alternatively computer readable program instructions 134 may be configured to carry out one or more other functions of certain embodiments of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of one or more aspects of the present invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As noted, the depicted example in FIG. 1, and discussed above, is not meant to imply architectural limitations. For instance, data processing system 100 of FIG. 1 could also be a server, workstation, tablet computer, laptop computer, or other device.

Figure 2:
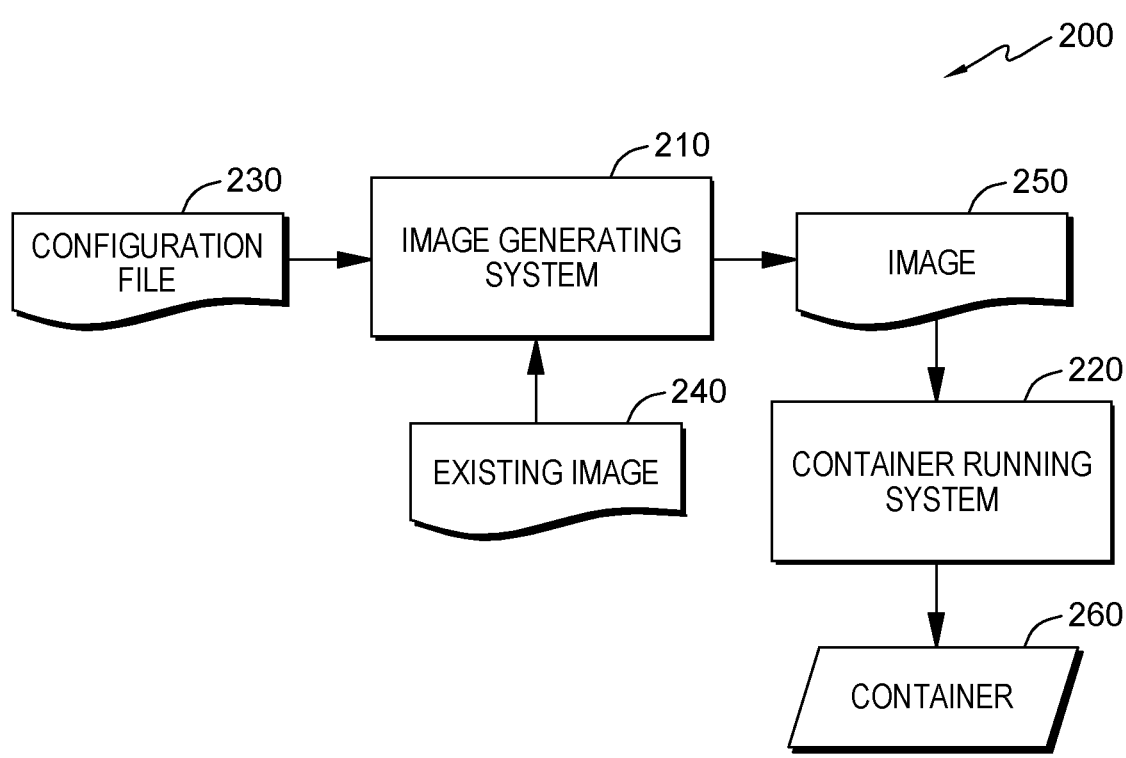
FIG. 2 depicts one embodiment of processing, in accordance with one or more aspects of the present invention.

FIG. 2 shows an environment 200 in which one or more embodiments of the present disclosure can be implemented. It is again to be understood that the structure and functionality of the environment 200 are described only for the purpose of illustration without suggesting any limitations as to the scope of the present disclosure. The embodiments of the present disclosure can be embodied, in one or more other implementations, with a different structure and/or functionality.

As illustrated in FIG. 2, environment 200 may generally include an image generating system 210 and a container running system 220. The image generating system 210 and/or the container running system 220 may be implemented by computer system 102, as discussed with reference to FIG. 1, for example. Some embodiments of the present disclosure may include two phases: an image generating phase and a container running phase.

During the image generating phase, the image generating system 210 may be configured to generate an image 250 based on a configuration file 230 and an existing image 240. As described above, an image can be built from a base image using a set of instructions. The base image may be contained in the existing image 240, and these instructions may be stored in the configuration file 230 (also called a "Dockerfile" in Docker). For example, the configuration file 230 may be a text-based script that contains instructions for generating the image 250. The image generating system 210 may read the configuration file 230 when the generation of the image 250 is requested, execute the instructions, and return the generated image 250.

Specifically, each of the instructions in the configuration file 230 may be executed step-by-step. In execution of each of the instructions, an intermediate container may be created so that the instruction is run inside the intermediate container. In this way, the intermediate container may contain all changes that need to be made to the underlying layers. Then a copy of the intermediate container is committed to an image. After all the instructions have been executed, all of the intermediate containers can be removed and the image 250 will be left. During the container running phase, the container running system 220 may be configured to read the image 250 to run a container 260.

Figure 3:
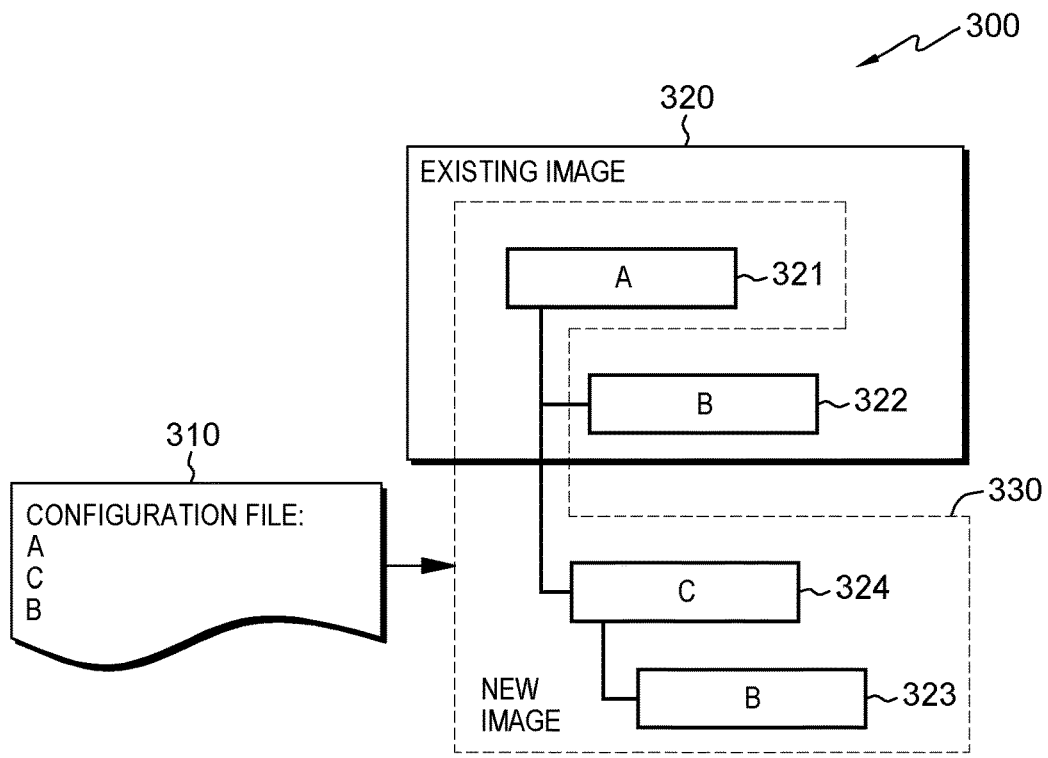
FIG. 3 shows an example of layer duplication resulting from a conventional processing solution.

As described above, each of the instructions stored in the configuration file 230 may create a layer in the image 250. Sometimes a layer to be created in the image 250 might have already existed in the existing image 240. In conventional solutions, duplicated layers will be introduced during the image generating phase because the layers within the image are overlays in a single inheritance tree. For example, FIG. 3 shows an example of layer duplication 300 in accordance with conventional solutions. As shown in FIG. 3, the existing image 320 includes Layer A 321 and Layer B 322, where Layer A 321 is assumed to be created prior to Layer B 322. The instructions stored in the configuration file 310 indicate that the layers to be created in sequence in the image 330 are Layer A, Layer C and Layer B. Due to the single-inheritance layering model, the image 330 will share Layer A 321 with the existing image 320, but a new copy of Layer B will be created in the image 330. That is because the base layer of Layer B 323 in the image 330 is Layer C 324, which is different from the base layer of Layer B 322 in the existing image 320. As a result, two copies of Layer B will be created, which may cause a waste of disk space.

In order to solve the above and other potential problems, a solution for layer deduplication is provided in accordance with example embodiments of the present disclosure. The layer deduplication may be performed with layer referencing during the image generating phase. Specifically, the layer deduplication can be achieved by enabling a recurring layer (such as Layer B 323) to refer to the content of the original layer (such as Layer B 322). That is, in accordance with embodiments of the present disclosure, if it is determined that a layer to be created for a new container is already present in an existing container, this layer can be "reused" without repeating the creation process, thereby improving the efficiency of container generation.

An example embodiment of this aspect of the present disclosure is discussed with reference to FIG. 4, which shows a method 400 for layer deduplication in accordance with one embodiment of the present disclosure. Method 400 will be described in connection with environment 200 shown in FIG. 2 and the example shown in FIG. 3. For example, in some embodiments, method 400 may be performed by the image generating system 210. Only for the purpose of illustration, in the following discussions, existing image 320 in FIG. 3 is referred to as the "first image" and the image 330 is referred to as the "second image." The container corresponding to the existing image 320 (not shown in FIG. 2) is referred to as the "first container" and the container 260 in FIG. 2 is referred to as the "second container." The Layer B 322 in the existing image 320 as shown in FIG. 3 is referred to as the "first layer." The Layer B 323 in the image 330 as shown in FIG. 3 is referred to as the "second layer", and the Layer C 324 in the image 330 is referred to as the "third layer."

Figure 4:
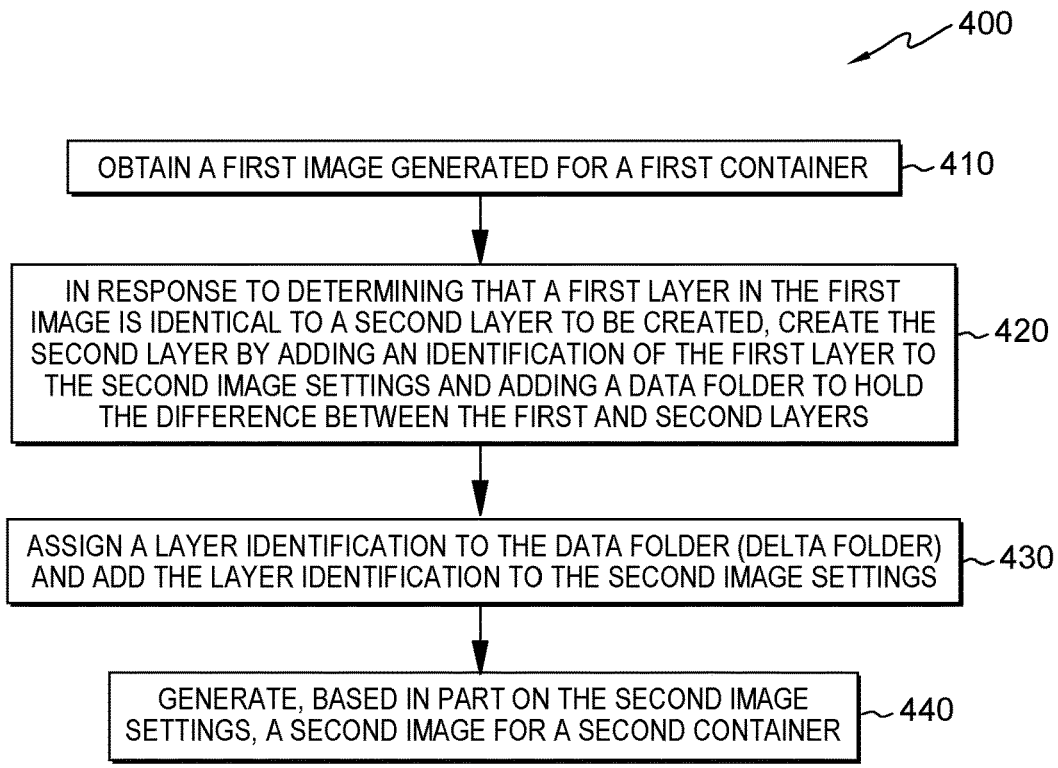
FIG. 4 is a flowchart of one embodiment of a method for layer deduplication, in accordance with one or more aspects of the present invention.

As shown in FIG. 4, method 400 is entered in step 410. In this step, in response to a request to create or generate a new image, the image generating system 210 (FIG. 2) obtains an existing image(s). As noted, for the sake of discussion, the existing image is referred to "a first image" and the image to be generated is referred to "a second image." The containers including the first and second images are referred to as first and second containers, respectively. In FIG. 3, the image 320 is the first image. The first image 320 may include a plurality of layers associated with the first container. Still in reference to the example shown in FIG. 3, the first image 320 may include the Layer A 321 and the Layer B 322, which is created after the Layer A 321. For example, the image generating system 210 (FIG. 2) may obtain the first image 320 generated for the first container from a local image repository. Moreover, the image generating system 210 may also determine from the first image 320 the plurality of layers it contains.

Then, the method 400 proceeds to step 420. If it is determined that a first layer in the first image 320 is identical to a second layer to be created in the second image, then the image generating system 210 creates the second layer by adding an identification in the first layer to the second image and adding a data folder (herein referred to as a delta layer) to hold any difference between the first and second layers 420. For example, in some embodiments, the image generating system 210 (FIG. 2) may determine from the configuration file 310 that the Layer B 323 (FIG. 3) to be created is identical to the Layer B 322 in the first image 320. In this case, instead of creating an entire copy of Layer B 322 as may be done with the existing solutions, the image generating system 210 may create the second layer by adding an identification of the first layer to the second image and adding a data folder (or delta layer) to hold the difference between the first and second layers. As illustrated in FIG. 4, a layer identification may be assigned to the data folder (or delta layer), and the layer identification may be added to the second image 430. Based, at least in part, on the identification of the first layer and the identification of the delta layer, the second layer may be generated for the second image for a second container 440. This may include leveraging, for instance, another union file system (AUFS) union mount, which as known, is a default storage driver in the Docker processing environment.

Figure 5:
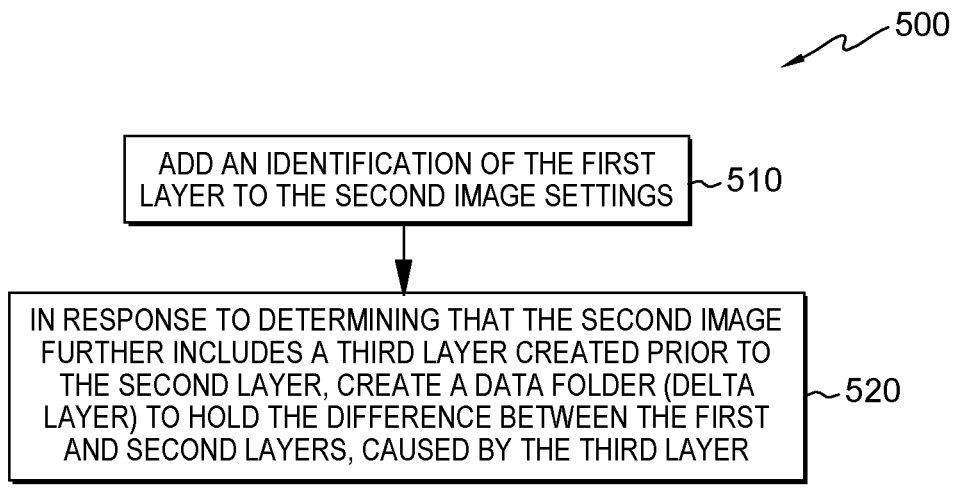
FIG. 5 depicts one embodiment of a process for generating a delta layer as part of layer deduplication, in accordance with one or more aspects of the present invention.

FIG. 5 illustrates one embodiment of a method 500 for referencing a first layer of a first image by a second layer of a second image. As shown, method 500 may include adding an identification of the first layer to the second image 510, and in response to determining that the second image further includes a third layer created prior to the second layer, creating a data folder (or delta layer) to hold the difference between the first and second layers, due to the intermediate third layer 520. Otherwise, the first and second layers will be identical, and the first layer will be used directly to avoid duplication.

Method 500 may be regarded as an implementation of step 420 in FIG. 4 of the method 400 shown, and may be executed by the image generating system 210 as illustrated in FIG. 2, for example.

As noted, in step 510, an identification of first layer is added to the second image where it is determined that the second layer to be created in the second image is a recurrence of the first layer. The identification points to the first layer in the first image. This is achieved without creating an entire copy of the first layer, thereby saving disk space.

However, in some embodiments, because the base layer of the second layer may be different from the base layer in the first layer, content of the first layer in the first image 320 (FIG. 3) may be different from that of the second layer to be created. In this case, the method 500 may proceed to an additional step 520. In step 520, if it is determined that a third layer is created for the second image 330 prior to the second layer, then the image generating system 210 (FIG. 2) creates a data folder (or delta layer) to hold the difference between the first and second layers. Still in reference to the example shown in FIGS. 2 & 3, the image generating system 310 may determine from the configuration file 310 that the Layer C 324 is created prior to the Layer B 323 for the second image 330. In this case, the image generating system 210 may create the delta layer to keep the differences introduced by the Layer C 324.

In some embodiments, this can be done by utilizing features of a file system, such as the file system of a Docker container. In the following discussions, the principle and idea of embodiments of the present disclosure are mainly illustrated in conjunction with Docker. It is to be understood that this is only for the purpose of illustration without suggesting any limitations as to the scope of the present disclosure. Examples of other containerization technology exist in the art.

Each Docker image may reference a list of read-only layers that represent file system differences. These layers are stacked on top of each other to form a base for a container's root file system. When a new image for a container is being created, a new, thin and writable layer may be added on top of the underlying stack. This layer is often called the "container layer." All changes made to the underlying read-only layers, such as writing new files, modifying existing files, and deleting files, are written to this thin writable container layer. When an existing file in the underlying read-only layers is modified, Docker may use a storage driver to perform a copy-on-write operation. The specific actions of the copy-on-write operation depend on the storage driver. For the Another Union File System or the Advanced Multiple-Layered Unification File System ((AUFS) which is the default storage driver in Docker), the copy-on-write operation may be performed as follows: searching through the image layers for the file to update, where the searching process may start at the top, newest layer and work down to the base layer one layer at a time. Then a "copy-up" operation may be performed on the first copy of the file that is found, where the "copy-up" operation copies the file up to the thin writable container layer. Next, the copy of the file in the thin writable container layer is modified. With this arrangement, the differences between the first and second layers can be ascertained by monitoring the "copy-up" event.

Figure 6:
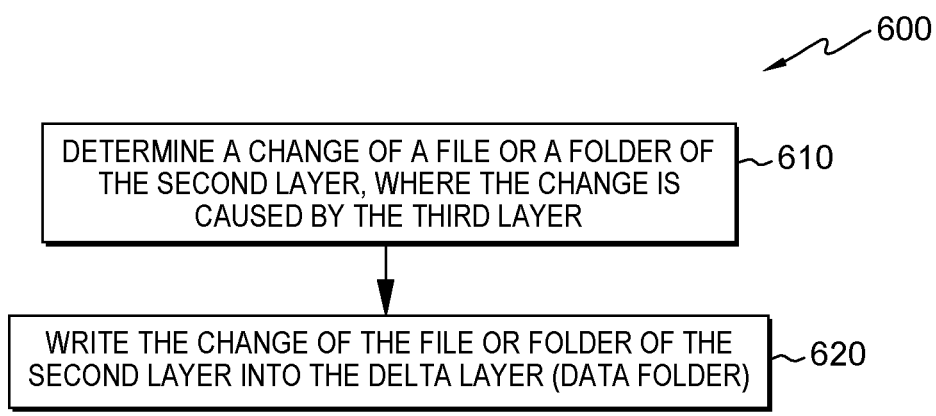
FIG. 6 depicts one embodiment of a process for selecting files or folders to be put into a delta layer, in accordance with one or more aspects of the present invention.

FIG. 6 shows a flowchart of a method 600 for generating a delta layer in accordance with one embodiment of the present disclosure. In step 610, a change of a file or a folder of the second layer is determined, where the change is caused by the third layer. In some embodiments, the change can be determined by monitoring an event such as the "copy-up" event on a file system, for example. As described above, in execution of the instruction for creating the second layer (that is, Layer B 323), an intermediate container can be created which may contain all changes that need to be made to the underlying layers. Therefore, the "copy-up" event on the file system of this intermediate container can be monitored to determine the change of a file or folder of the second layer caused by the third layer. In some embodiments, the "copy-up" event can be monitored by modifying source code of the file system (for example, the file "cpup.c" for the AUFS used by Docker). Alternatively, or in addition, the monitoring may only occur during the image generating phase to reduce the performance impact. Then, in step 620, the change of the file or folder of the second layer is written into the delta layer (or data folder).

It is to be understood that the change in the second layer caused by the third layer can be determined in other suitable manners as well. For example, in addition to or instead of monitoring the system event, it is possible to determine the change by periodically checking the status of the second or third layer, and/or by receiving a message indicating the change.

In addition to creating the delta layer associated with the first layer, the creation of the second layer may also include generating metadata associated with the second layer. The metadata may include a checksum, a description file, layer size of the second layer and so on. The checksum may contain a cryptographic hash of contents of the second layer's data archive. The description file may be in JavaScript™ Object Notation (JSON) format, which may describe some basic information about the second layer such as date created, author, and the identifier of its parent image, as well as runtime configuration like its entry point, default arguments, Central Processing Unit (CPU) or memory shares, networking, and volumes. (Java and other Java-related marks discussed herein are trademarks or registered trademarks of Oracle Corp., of Redwood Shores, Calif., USA.)

Referring back to FIG. 4, and as noted, the method 400 proceeds to step 440, where a second image for a second container is generated based, in part, on the created second layer. In the example as shown in FIG. 3, the instructions stored in the configuration file 310 indicate that the layers to be created in sequence in the image 330 are the Layer A, the Layer C and the Layer B. After the Layer B 323 is created, all of the instructions stored in the configuration file 310 have been executed. The image 330 can thus be generated.

Figure 7:
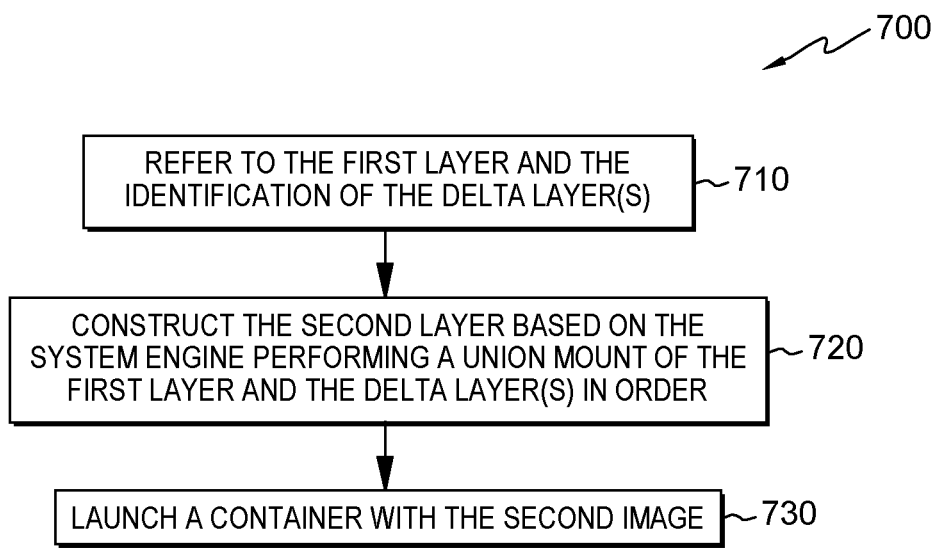
FIG. 7 depicts one embodiment of a method for constructing a second image, in accordance with one or more aspects of the present invention.

In some embodiments, the generated image 330 may then be read by the container running system 220 (FIG. 2) to run the second container 260. Specifically, the container running system 220 may read and access data folders associated with each of the plurality of layers in the image 330. FIG. 7 shows a flowchart of a method 700 for reading the data associated with the second layer in accordance with one embodiment of the present disclosure. The method 700 will be described in connection with the environment 200 shown in FIG. 2 and the example shown in FIG. 3. For example, in some embodiments, the method 700 may be executed by the container running system 220 as illustrated in FIG. 2.

In step 710, the container running system 220 reads or refers to the first layer and the identification of the delta layer(s) associated with the second layer. Then, in step 720, the second layer may be constructed based on, for instance, the system engine performing a union mount of the first layer and the delta layer(s) in order. In step 730, a container may be launched, for instance, by container running system 220, which includes second image. In this way, this state of the second layer can be restored, and the second container launched. As noted above, the content of the delta layer contains any difference caused by the third layer. Therefore, the difference may shadow the files or folders of the first layer, and the state of the second layer may be restored to its original state in the image generating process.

Through the above descriptions, it will be understood that embodiments of the present disclosure enable a recurring layer to refer to the content of the original layer, such that the disk space can be significantly saved (that is, the layer size of the recurring layer can be greatly reduced). By collecting the "copy-up" events for the recurring layer, the side effects caused by ancestor layers can be preserved. Moreover, the configuration file (such as the "Dockerfile" in Docker) does not need to be changed to achieve such layer deduplication.

Figure 8:
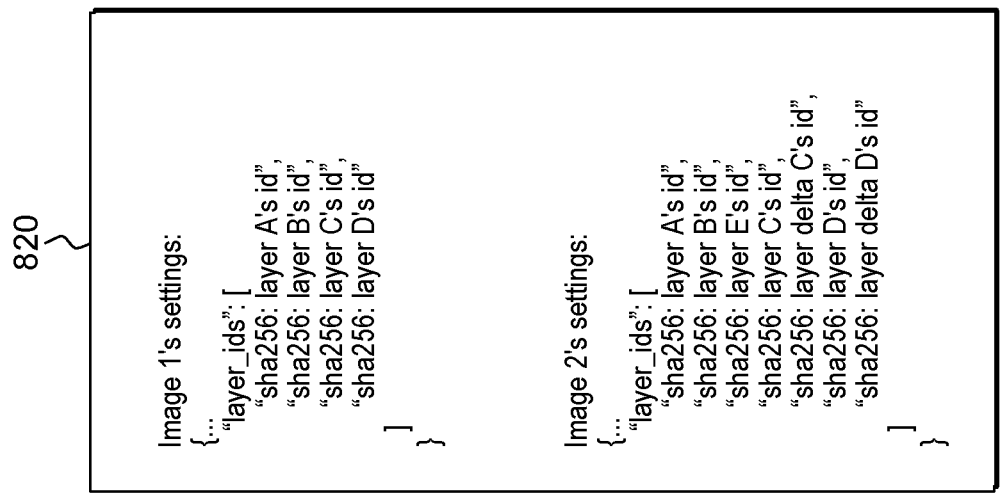
FIG. 8 is an overview of one embodiment of layer deduplication with layer referencing, in accordance with one or more aspects of the present invention.
Figure 8:
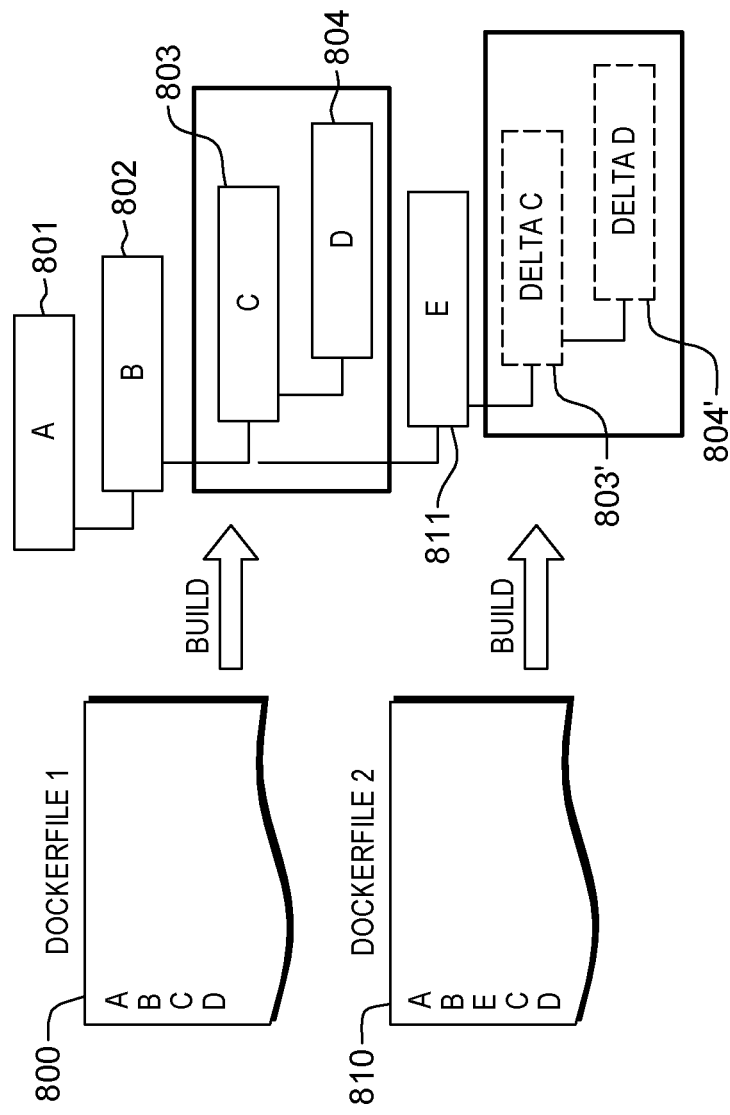

By way of further explanation, FIG. 8 depicts an overview of layer deduplication and layer referencing, in accordance with one or more aspects of the present invention. Two system files or Dockerfiles 800, 810 are shown, with Dockerfile 800 including instructions A, B, C & D, and Dockerfile 810 including instructions A, B, E, C & D. As illustrated, by building the Docker image for Dockerfile 1 first, a tree is created which contains layers A-D 801-804, respectively. Assuming that Dockerfile 2 is next to be built, the processing disclosed herein may reuse existing layers C & D 803-804. However, because of the existence of layer E, new layers C & D might be slightly different from the existing layers C & D. Hence, after building E 811 in connection with the second image, a delta layer C 803' and a delta layer D 804' may be provided to track the differences between the existing layers C & D 803, 804 and the new layers C & D being constructed following layer E. The delta C layer 803' contains files or folders that identify differences from the ones in the original C layer 803, and similarly delta D layer 804' contains files or folders corresponding to the differences from the D layer 804'. By updating this information in each image setting, existing layers can be reused. This can be achieved, in part, by leveraging for instance the union mount of AUFS noted above. As known in the art, union mounting is an approach for combining multiple directories into one that appears to contain their combined contents.

Example code settings 820 are also provided in FIG. 8 for one embodiment of image 1's settings, as well as image 2's settings. As noted, when some layers have already been created, (layers C & D in this example), and because of the insertion of layer E in Dockerfile 2, the content of existing layer C and new layer C may not be the same, as may the content of layer D and new layer D. In one or more implementations, the image builder (e.g., Docker builder) creates only delta layers of the recurring instructions, which advantageously saves disk space. This is illustrated in the code for image 2's settings, which includes a layer delta C identifier, and a layer delta D identifier, each following the respective reference to the pre-existing layer C & D.

In one or more further aspects, disclosed herein are computer-implemented methods, systems and computer program products for facilitating optimizing storage of images in single-inheritance, container-based data processing environments, such as in Docker, using multi-inheritance. As noted, Docker is a popular cloud deployment environment today. As a result, consumption of associated storage, such as Docker Hub, Docker Registry, or Docker Trusted Registry (DTR) has increased rapidly. Further, by analyzing, for instance, the Docker Hub, repeating keywords can be found extensively. This illustrates that there are many duplicate images stored in Docker Hub, which necessarily increases storage consumption. In fact, storage consumption could be significantly reduced by eliminating these duplications. Thus, in order to reduce storage consumption associated with, for instance, Docker, the above-described deduplication processing may be used in association with a multi-inheritance facility to provide a solution to the storage consumption problem.

More particularly, as a solution, disclosed herein is a multi-inheritance model to support, for instance, a "FROM" instruction that accepts more than one image when, for instance, writing an image configuration file, such as a Dockerfile. As noted, a root cause of disk space usage proliferation in container-based environments, such as Docker, is that the file system uses a single-inheritance model to organize its layers and images. Hence, disclosed herein, is a facility which allows a multiple-inheritance model to be combined with the underlying single-inheritance container-based environment. This combining occurs within the layers or images hierarchy, as explained herein. Behind the scenes, the parser, such as a Docker parser, combines all files, such as Dockerfiles (identified in a "FROM" instruction) into a composited directory file (e.g., composited Dockerfile) on the fly. This composited directory file is then provided to the builder facility (e.g., Docker builder) to build the image. Note in this regard that Dockerfiles of "FROM" instruction references are assumed to use the same base image.

As noted, a root cause for storage issues associated with container-based processing environments is that the environments typically use a single-inheritance model. Docker is one example of this where the Docker layers and images are organized pursuant to a single-inheritance tree. As a solution, disclosed herein is a multi-inheritance facility which is overlaid onto the conventional image build process, such as the conventional Docker image build process. As explained below, the multiple-inheritance facility leverages the above-described layer deduplication with layer referencing processing to reduce local disk usage. Additional, content addressable storage processing available in the container-environment, such as Docker 1.10, may be used in accordance with the processing described herein to eliminate duplicated layers being pushed to, for instance, Docker Hub or Docker Registry.

Figure 9:
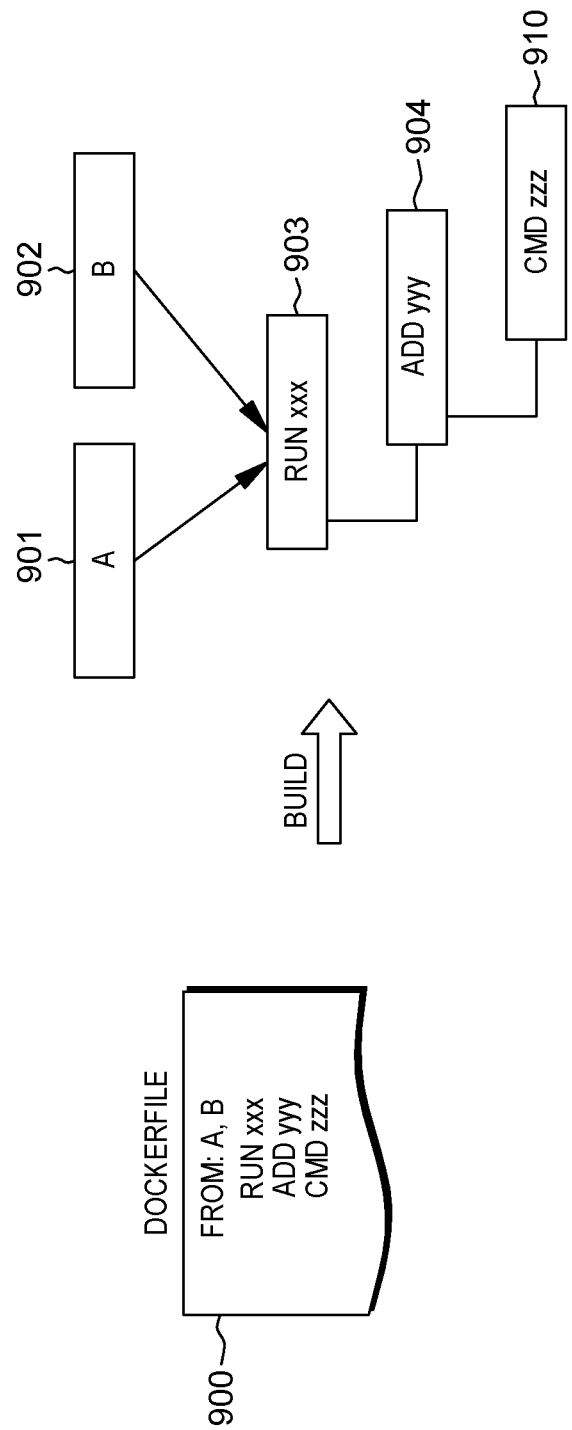
FIG. 9 depicts one embodiment of generating a configuration file for generating a composited image from, in part, a multi-inheritance instruction in a single-inheritance container-based processing environment, in accordance with one or more aspects of the present invention.

Referring to FIG. 9, a Dockerfile 900 is allowed, in accordance with one or more aspects of the present invention, which includes an instruction that is a multiple-inheritance instruction (i.e., "FROM: A, B"). In programming language, inheritance means reusing existing code, layers, images, etc. Thus, the provided FROM instruction is leveraged to refer to multiple existing images A-B 901-902, respectively in FIG. 9. In one or more embodiments, the Dockerfiles of the "FROM" instruction reference images using the same base image, as explained herein. Further, assume that the "RUN", "ADD" and "CMD" instructions are new to Dockerfile 900, in which case the illustrated tree of FIG. 9 thus includes separate RUN xxx 903, ADD yyy 904 and CMD zzz 910 layers. This assumes the "CMD" instruction requires special treatment, and the instructions are collected into a script or file with the command instruction being added to launch the image while starting the container. The remaining instructions are concatenated and sequenced such as in FIG. 9. In this manner, layer duplication can be eliminated, thereby reducing disk space consumption globally.

Generally stated, disclosed herein are computer-implemented methods, systems and computer program products for facilitating multi-inheritance within a single-inheritance container-based environment. The facilities disclosed herein advantageously reduce storage requirements within the single-inheritance container-based processing environment. In one or more implementations, the computer-implemented method includes generating, based on a configuration file with a multi-inheritance instruction, a composited image for a new container from multiple existing images of the single-inheritance container-based environment. The multiple existing images are identified in the multi-inheritance instruction, and the generating includes creating a composited directory file which, in part, references layers of the multiple existing images, and associating a command instruction of the configuration file with the composited directory file. Further, the generating includes building the composited image in association with starting the new container, the building is based on the composited directory file in associated command. Note that the use of "composited" herein in referring to the image, directory file, etc. is merely for convenience in identifying the particular image, directory file, etc. at issue. The composited image built and launched within the new container functions substantially identical to an image built using existing methodologies.

In one or more implementations, the multiple existing images in the single-inheritance container-based environment are derived from a common base image.

In one or more embodiments, creating the composited directory file further includes concatenating the referenced layers of the multiple existing images and an original layer obtained from the configuration file into the composited directory file. Further, the building process of the computer-implemented process may include re-using the referenced layers of the multiple existing images concatenated into the composited directory file when building the composited image. In one or more embodiments, the referenced layers concatenated into the composited directory file reference previously constructed instructions, and for at least one recurring instruction in the composited directory file, the creating includes providing a corresponding delta layer to track any difference between the previously constructed instruction and a corresponding current instruction being built, and further referencing the delta layer(s) in image settings for the composited image.

In one or more embodiments, the computer-implemented method may further include saving the composited image to storage. The saving may include saving a manifest file identifying reused, previously constructed layers of the multiple existing images in the composited image, and identifying one or more respective delta layers, each tracking any difference between a previously constructed layer and a corresponding current layer used in building the composited image. The saving may further include saving the respective delta layer(s) used in building the composited image without further saving in the storage the re-used, previously constructed layers of the multiple existing images in the composited image.

In one or more implementations, the computer implemented method may further include retrieving the composited image. The retrieving may include obtaining the manifest file from storage and re-establishing the composited image using the manifest file. The re-establishing may include downloading from the storage the respective delta layer(s), and re-assembling layers identified in the manifest file, including the respective delta layer(s), into the composited image. The retrieving may further include obtaining the re-used, previously constructed layers of the multiple existing images from the multiple existing images and re-establishing the composited image.

As summarized above, and described further below with reference to FIGS. 10-13, the present disclosure addresses building an image, pushing an image to registry, and pulling an image from registry, wherein the image is referred to as a composited image. For building a composited image, a new component, referred to as the "collector" is added to collect the configurations of the multiple existing images from storage (e.g., third party Dockerfiles from Docker Hub). Not all images stored in Docker Hub have a Dockerfile, and so the collector inspects the image description to ensure that it equals the particular Dockerfile of the multiple existing images desired. The Docker system can inspect every layer's description currently, and this behavior can be used to generate the entire image's description. These Dockerfiles then will be used by the parser component to generate an intermediate Dockerfile for the new image. If any of these dependent images is not available locally, a distributor component will pull the image from, for instance, Docker Hub, DTR, or Docker Registry. Using the process described herein, and in particular the multiple-inheritance approach discussed, layer duplication can be removed from the file system.

For pushing, or saving, a composited image, layers of the image already in storage (e.g., on Docker Hub) will not be uploaded. For the remaining layers, they will be uploaded, and during the pushing process, a manifest file of the composited image may have one or more layers which reference a preexisting layer in an existing image, and which have associated therewith a delta layer with difference information, such as described herein. For pulling, or retrieving, a composited image, an opposite process is performed, and layers of the composited image may be downloaded in parallel.

Figure 10:
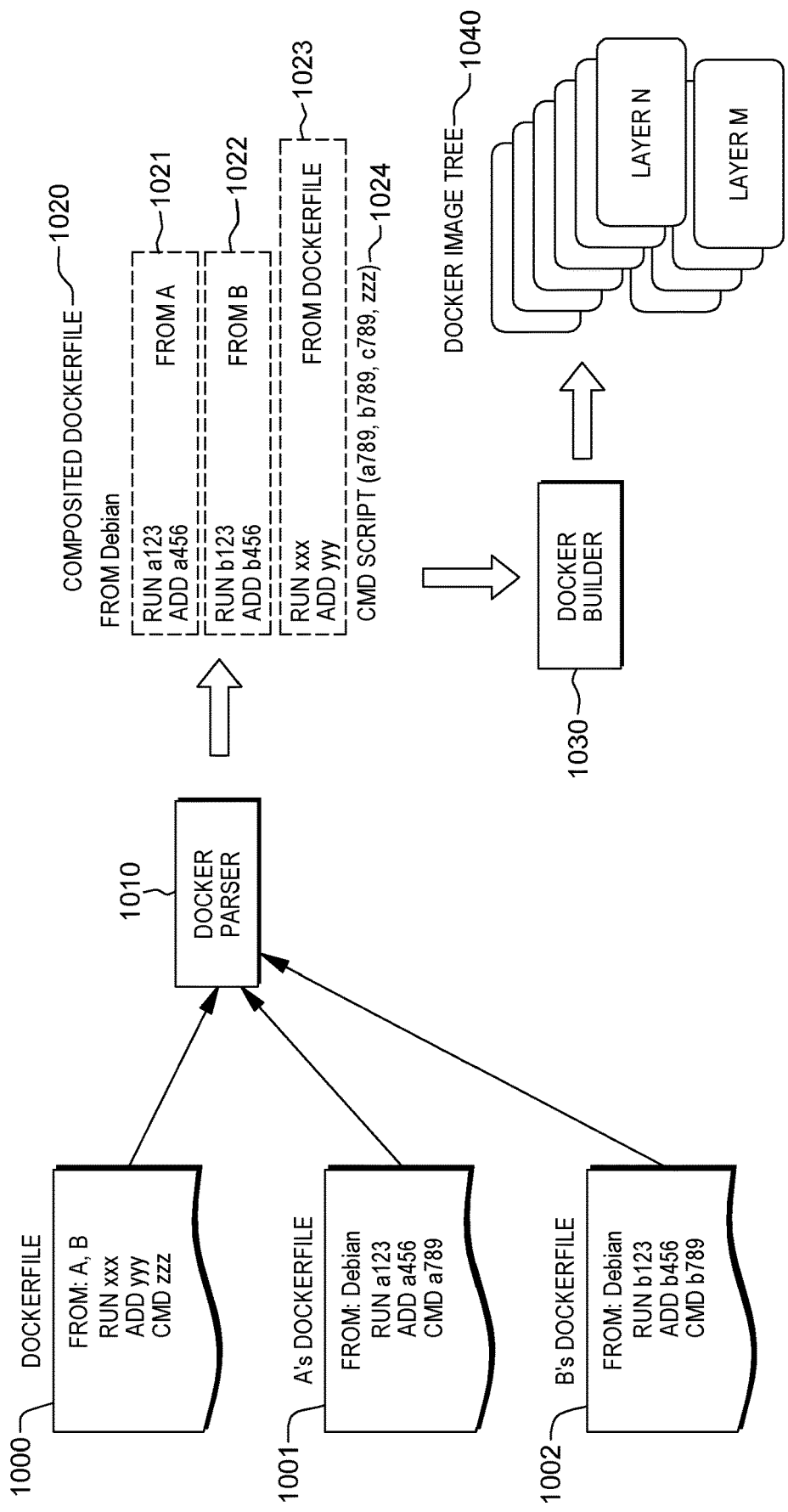
FIG. 10 depicts a more detailed example of building a composited image based, in part, on a multi-inheritance instruction within a configuration file, in accordance with one or more aspects of the present invention.

FIG. 10 depicts a more detailed example of a process for generating a composited image, in accordance with one or more aspects of the present invention. As illustrated, a Dockerfile 1000 may include a multi-inheritance instruction ("FROM: A,B") which references multiple existing images 1001-1002 (referenced as A's Dockerfile & B's Dockerfile). A Docker parser 1010 reads Dockerfile 1000 and also reads Dockerfiles 1001-1002, e.g., from Docker Hub, or induces the Dockerfiles from images directly. Parser 1010 generates a composited Dockerfile 1020, also referred to herein as a composited directory file. Note that in this process, each existing image 1001-1002 referenced in the multi-inheritance instruction refers to a common ancestor, which in this case is the "Debian" base image. This feature may be, in one or more embodiments, a requirement for the disclosed process. As illustrated, the composited directory file or composited Dockerfile 1020 concatenates recurring layers, such as layers 1021 from A's Dockerfile 1001, layers 1022 from B's Dockerfile 1002, as well as layers 1023 from original Dockerfile 1000, and associates the command instruction 1024 of the Dockerfile with the concatenated layers. The composited Dockerfile or composited directory file, is then used by Docker builder 1030 to build the Docker image tree 1040 with the specified layers. Should an instruction duplicate with another instruction in the composited Dockerfile, the above-described deduplication with layer referencing will reduce the system storage consumption, as described herein.

Figure 11:
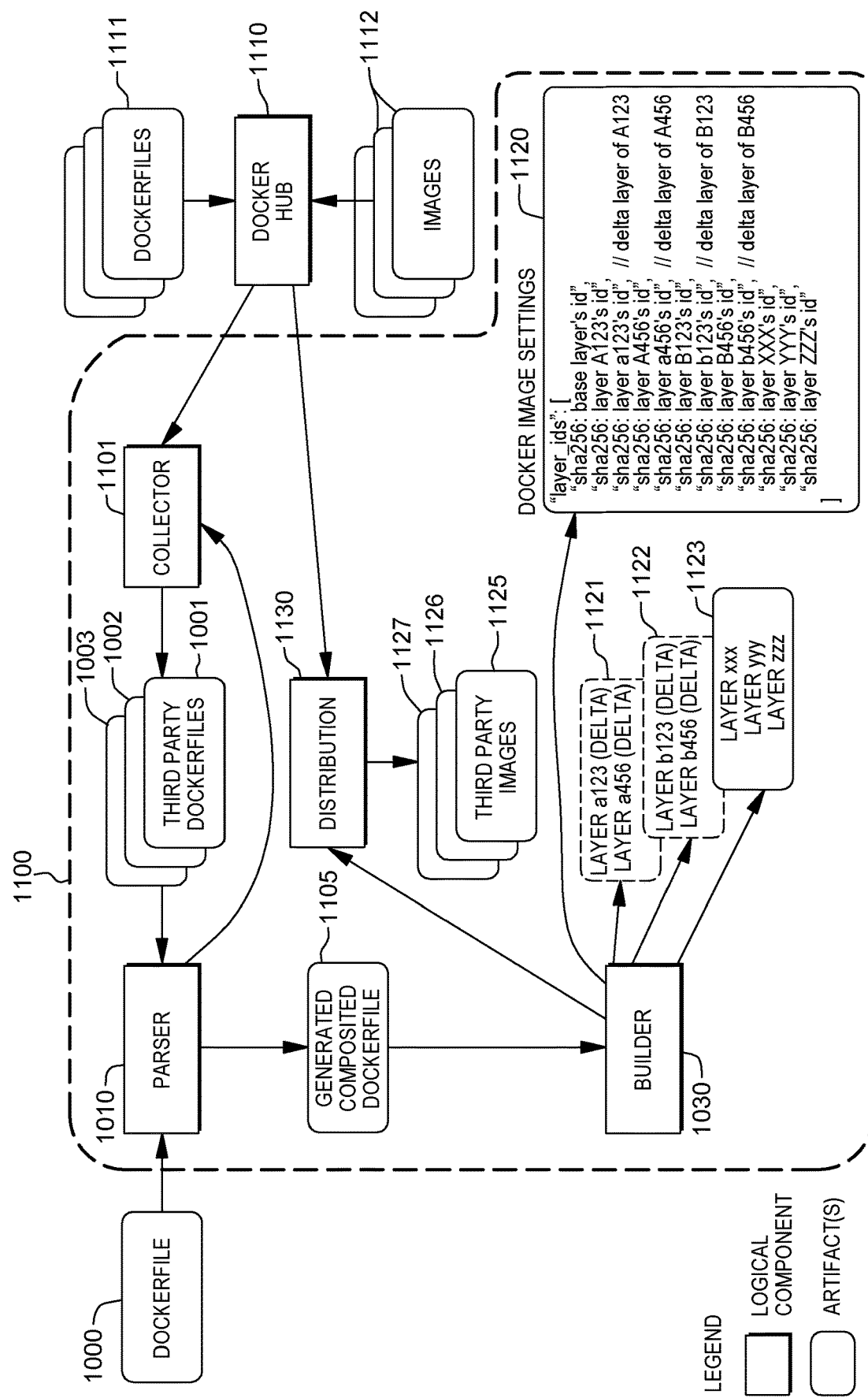
FIG. 11 depicts further details of one embodiment of a process for building a composited image, in accordance with one or more aspects of the present invention.

FIG. 11 depicts one embodiment of a system and process for building a composited image, in accordance with one or more aspects of the present invention. As explained above, the system 1100 may include parser 1010 which receives a Dockerfile 1000 having a multi-inheritance instruction referencing different layers of multiple existing images. A collector component 1101 is provided for collecting Dockerfiles 1111 from Docker Hub 1110, which also contains Docker images 1112. The Dockerfiles 1111 are saved within the system as the third party Dockerfiles 1001-1002 (in this example) which are referenced in the original Dockerfile 1000. This third party Dockerfiles memory may be a type of caching mechanism. If parser 1010 is unable to locate a required existing Dockerfile, then it may contact collector 1101 to obtain the file.

As discussed, parser 1010 generates the composited Dockerfile 1105 based on the original Dockerfile 1000 and the third party Dockerfiles 1001-1002 (in this example) to build the composited image. If Docker builder 1030 is unable to locate a particular layer or Docker image from the third party images 1125-1127, it will consult distribution element 1130 to download the particular image or layer from Docker Hub 1110. Docker builder 1030 constructs the remaining layers as usual. Should Docker builder 1030 identify a recurring instruction (e.g., a123, a456, b123, etc.) it refers back to a previously constructed layer instead, for instance, using an identification of the previously constructed layer in the composited Dockerfile, and creates a delta layer to track any difference between the existing layer and the currently being built layer. Identifications of these delta layers 1121-1122 are also put into the Docker images settings 1120, along with the original layers 1123 from Dockerfile 1000.

Figure 12:
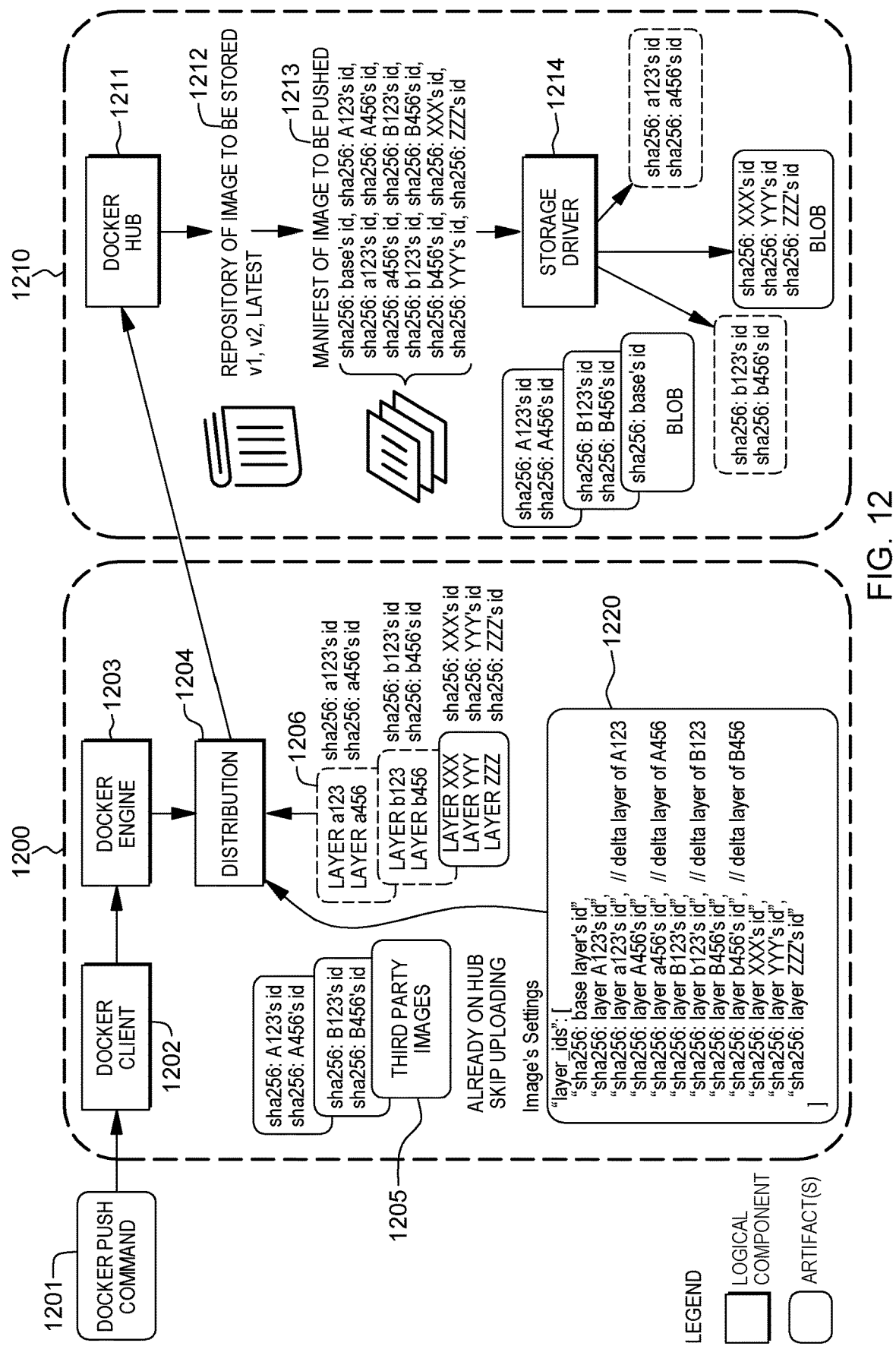
FIG. 12 depicts one embodiment of a process for pushing, or saving, a composited image, in accordance with one or more aspects of the present invention.

FIG. 12 depicts one embodiment of a system and process for pushing, or saving, a composited image. The system 1200 is communicatively coupled to storage 1210, and includes a Docker client 1202 which receives the user-issued Docker push command 1201 and passes the command to a Docker engine 1203. A distribution component 1204 coupled to Docker engine 1203 determines which Docker image and its corresponding layers need to be uploaded to storage 1210. For third party images 1205 referenced by the composited image, those images will not be uploaded since they are already on the Docker Hub. As illustrated in FIG. 12, the images settings may further include delta layers. For instance, a layer with a123 is a delta layer for the layer A123 of the third party image. As noted, when the Docker build instruction re-uses a layer, there may be content differences between the original and newly created layers, which are tracked in the corresponding delta layer. When pushing a composited image to Docker Hub, there are multiple repositories to host the images 1212. For each image, including each composited image, there is a manifest file 1213 which tracks the layers the image requires. As illustrated in the figure, the manifest file may contain "sha256:debian's id, sha256:A123's id, sha256:a123's id, . . . sha256:zzz's id." The real layers which are pushed in this example are "a123, a456, b123, b456, xxx, yyy, and zzz", which are shown preserved to disk via a storage driver 1214.

Figure 13:
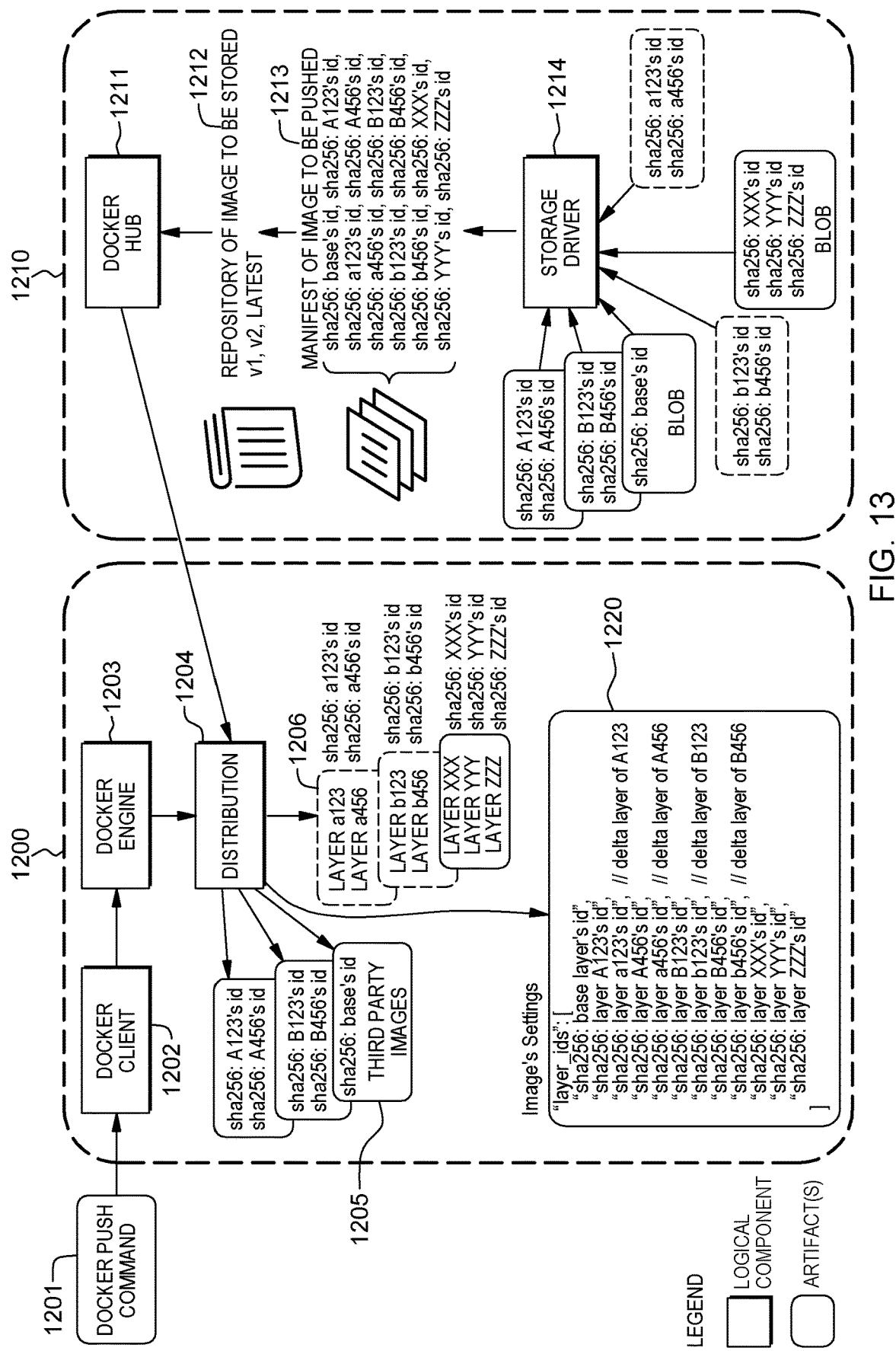
FIG. 13 depicts one embodiment of a process for pulling, or retrieving, a composited image, in accordance with one or more aspects of the present invention.
Figure 14:
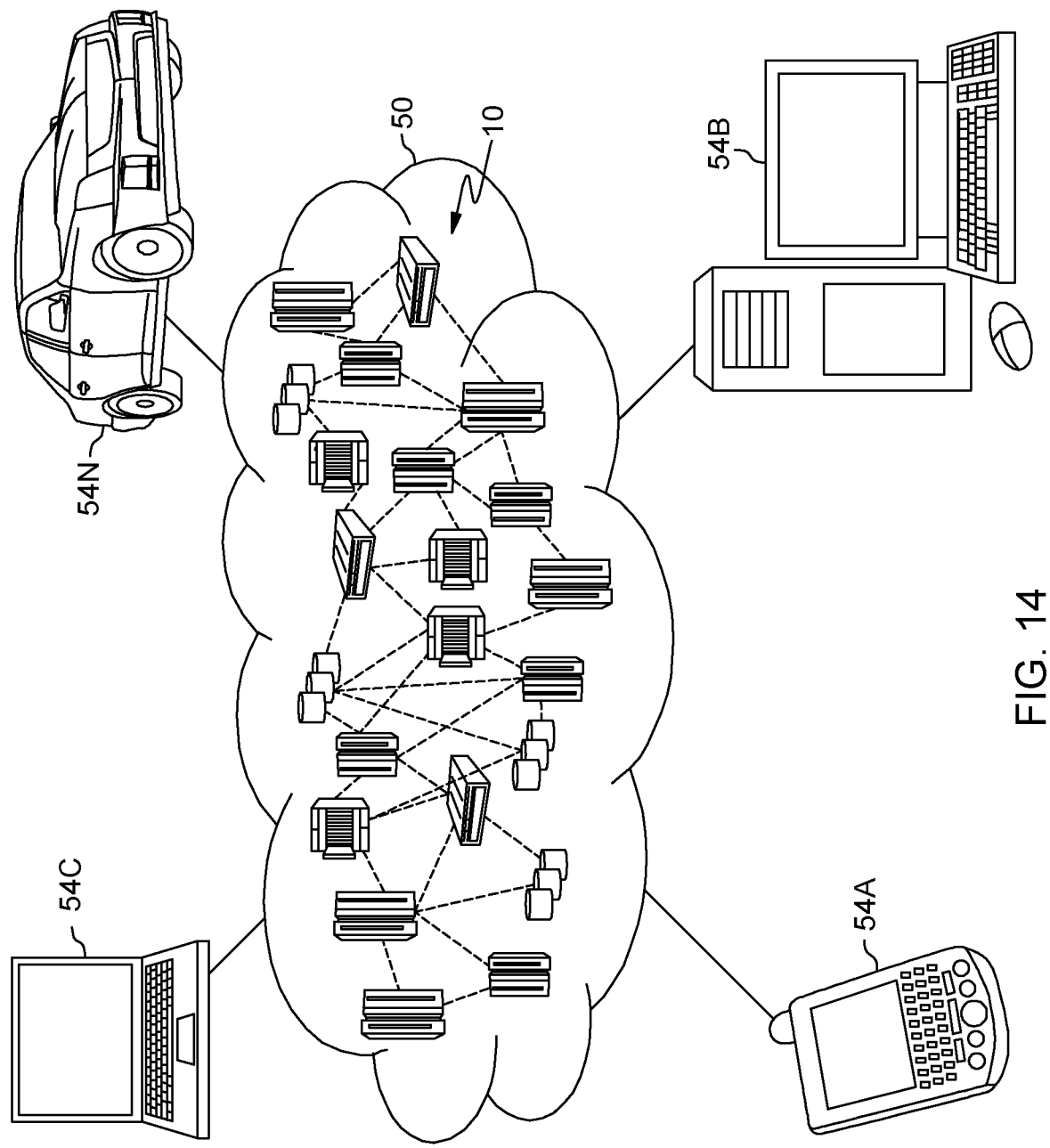
FIG. 14 depicts one embodiment of a cloud computing environment which may facilitate implementing, or be used in association with, one or more aspects of the present invention.
Figure 15:
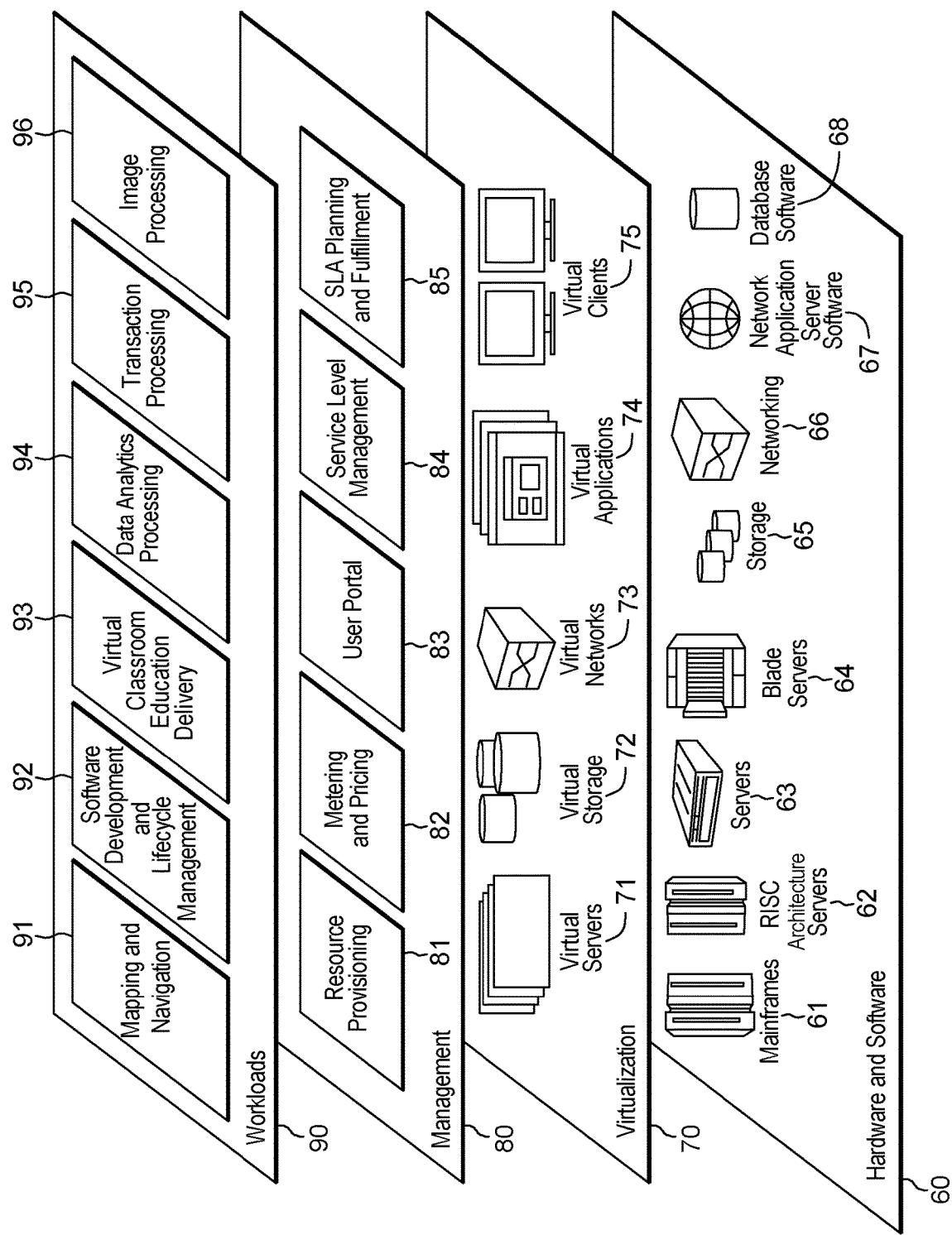
FIG. 15 depicts an example of extraction model layers, which may facilitate implementing image processing with multi-inheritance within a single-inheritance, container-based data processing system, in accordance with one or more aspects of the present invention.

FIG. 13 depicts the system of FIG. 12, where the user instead issuing a Docker pull command 1300 to retrieve a composited image. Processing of a Docker pull command 1300 is similar to the Docker push command, only the opposite steps are performed. When distribution component 1204 receives the Docker pull command, it will download the manifest file 1213 from storage first, and then may download layers (e.g., in parallel) based on the content of the manifest file. As illustrated in the figure, these layers may include a123, 1456, b123, b456, xxx, yyy, and zzz. If Docker engine cannot find layers debian (base layers), A123, A456, B123, and B456, on the local machine or system 1200, it may download then as well from storage.

Those skilled in the art will note from the above description that provided herein is a facility to reduce storage duplication in a single-inheritance container-based processing environment. A multiple-inheritance model is disclosed to support a "FROM" instruction that accepts more than one existing image when writing a Dockerfile. As explained, a root cause of storage consumption on Docker Hub, Docker Registry and Docker Trusted Registry (DTR) is that Docker uses a single-inheritance model to organize its layers and images. Hence, disclosed herein is a facility which allows a multiple-inheritance model in the layer and image hierarchy. Behind the scene, the Docker parser will combine all Dockerfiles ("FROM" instruction references and itself) into a composited Dockerfile on the fly and handed over to the Docker builder to build the image. Assuming that the "CMD" instruction requires special treatment, the instruction is collected into a script and the command instruction is added to launch while starting the container. For the remaining instructions, they are concatenated in a sequence in the image's settings. In this manner, layer duplication can be eliminated, thereby reducing storage space consumption.

For facilitating building an image, a new component, referred to as the collector component, is added to collect third party Dockerfiles from the Docker Hub. Not all images stored in Docker Hub have a Dockerfile, and so the collector inspects the image description to determine whether it equals the Dockerfile of the image desired. Docker can inspect a layer's description currently, which can be leveraged to generate the entire image's description discussed herein. These Dockerfiles are then used by the parser to generate an intermediate Dockerfile for the new image. If any of the dependent images is not available locally, the distribution component will pull the file from Docker Hub, DTR, or Docker Registry. Thus, the local Docker host has no resulting layer duplication with this multi-inheritance approach within the underlying single-inheritance container-based processing environment.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used, if desired.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method for facilitating multi-inheritance within a single-inheritance container-based environment, the computer-implement method comprising:
generating, based on a configuration file with a multi-inheritance instruction, a composited image for a new container from multiple existing images of the single-inheritance container-based environment, the multiple existing images being identified in the multi-inheritance instruction, and the generating comprising:
creating a composited directory file which, in part, references layers of the multiple existing images and associating a command instruction of the configuration file with the composited directory file; and building the composited image in association with starting the new container, the building being based on the composited directory file and associated command; and saving the composited image to storage, the saving comprising saving a manifest file identifying re-used, previously constructed layers of the multiple existing images in the composited image, and identifying one or more respective delta layers tracking any difference between a previously constructed layer and a corresponding current layer used in building the composited image.

2. The computer-implemented method of claim 1, wherein the multiple existing images in the single-inheritance container-based environment are derived from a common base image.

3. The computer-implemented method of claim 1, wherein the creating further comprises concatenating referenced layers of the multiple existing images and an original layer obtained from the configuration file into the composited directory file.

4. The computer-implemented method of claim 3, wherein the building comprises re-using the referenced layers of the multiple existing images concatenated into the composited directory file when building the composited image.

5. The computer-implemented method of claim 3, wherein the referenced layers concatenated into the composited directory file reference previously constructed instructions, and for at least one recurring instruction in the composited directory file, the creating includes providing a corresponding delta layer to track any difference between the previously constructed instruction and a corresponding current instruction being built, and further referencing the delta layer in image settings for the composited image.

6. The computer-implemented method of claim 1, wherein the saving comprises saving the respective delta layer(s) used in building the composited image without further saving in the storage the re-used, previously constructed layers of the multiple existing images in the composited image.

7. The computer-implemented method of claim 6, further comprising retrieving the composited image, the retrieving comprising obtaining the manifest file and re-establishing the composited image using the manifest file, the re-establishing including downloading from the storage the respective delta layer(s), and re-assembling layers identified in the manifest file, including the respective delta layers, into the composited image.

8. The computer-implemented method of claim 7, wherein the retrieving further comprises obtaining the re-used, previously constructed layers of the multiple existing from the multiple existing images in re-establishing the composited image.

9. A system for facilitating multi-inheritance within a single-inheritance container-based environment, the system comprising:

a memory; and a processing circuit communicatively coupled with the memory, wherein the system performs a method comprising:

generating, based on a configuration file with a multi-inheritance instruction, a composited image for a new container from multiple existing images of the single-inheritance container-based environment, the multiple existing images being identified in the multi-inheritance instruction, and the generating comprising:

creating a composited directory file which, in part, references layers of the multiple existing images and associating a command instruction of the configuration file with the composited directory file; and building the composited image in association with starting the new container, the building being based on the composited directory file and associated command; and saving the composited image to storage, the saving comprising saving a manifest file identifying re-used, previously constructed layers of the multiple existing images in the composited image, and identifying one or more respective delta layers tracking any difference between a previously constructed layer and a corresponding current layer used in building the composited image.

10. The system of claim 9, wherein the multiple existing images in the single-inheritance container-based environment are derived from a common base image.

11. The system of claim 9, wherein the creating further comprises concatenating referenced layers of the multiple existing images and an original layer obtained from the configuration file into the composited directory file.

12. The system of claim 11, wherein the building comprises re-using the referenced layers of the multiple existing images concatenated into the composited directory file when building the composited image.

13. The system of claim 11, wherein the referenced layers concatenated into the composited directory file reference previously constructed instructions, and for at least one recurring instruction in the composited directory file, the creating includes providing a corresponding delta layer to track any difference between the previously constructed instruction and a corresponding current instruction being built, and further referencing the delta layer in image settings for the composited image.

14. The system of claim 9, wherein the saving comprises saving the respective delta layer(s) used in building the composited image without further saving in the storage the re-used, previously constructed layers of the multiple existing images in the composited image.

15. The system of claim 14, further comprising retrieving the composited image, the retrieving comprising obtaining the manifest file and re-establishing the composited image using the manifest file, the re-establishing including downloading from the storage the respective delta layer(s), and re-assembling layers identified in the manifest file, including the respective delta layers, into the composited image.

16. The system of claim 15, wherein the retrieving further comprises obtaining the re-used, previously constructed layers of the multiple existing from the multiple existing images in re-establishing the composited image.

17. A computer program product for facilitating multi-inheritance within a single-inheritance container-based environment, the computer program product comprising:

a computer readable storage medium readable by a processing circuit and storing instructions for execution by the processing circuit which, when executed, perform a method comprising:

generating, based on a configuration file with a multi-inheritance instruction, a composited image for a new container from multiple existing images of the single-inheritance container-based environment, the multiple existing images being identified in the multi-inheritance instruction, and the generating comprising:
- creating a composited directory file which, in part, references layers of the multiple existing images and associating a command instruction of the configuration file with the composited directory file; and
- building the composited image in association with starting the new container, the building being based on the composited directory file and associated command; and saving the composited image to storage, the saving comprising saving a manifest file identifying re-used, previously constructed layers of the multiple existing images in the composited image, and identifying one or more respective delta layers tracking any difference between a previously constructed layer and a corresponding current layer used in building the composited image.

18. The computer program product of claim 17, wherein the creating further comprises concatenating referenced layers of the multiple existing images and an original layer obtained from the configuration file into the composited directory file, and wherein the building comprises re-using the referenced layers of the multiple existing images concatenated into the composited directory file when building the composited image.

* * * * *